No. 832,053. PATENTED OCT. 2, 1906.
C. K. GEORGE & J. BURNETT.
STONE SAW.
APPLICATION FILED FEB. 5, 1906.

Witnesses
Inventors
C. K. George &
John Burnett.
by James J. Sheehy Attorney

UNITED STATES PATENT OFFICE.

CORTIS KIMBALL GEORGE AND JOHN BURNETT, OF MILFORD, NEW HAMPSHIRE.

STONE-SAW.

No. 832,053.

Specification of Letters Patent.

Patented Oct. 2, 1906.

Application filed February 5, 1906. Serial No. 299,498.

*To all whom it may concern:*

Be it known that we, CORTIS KIMBALL GEORGE and JOHN BURNETT, citizens of the United States, residing at Milford, in the county of Hillsboro and State of New Hampshire, have invented new and useful Improvements in Stone-Saws, of which the following is a specification.

Our invention pertains to the art of sawing stone.

It is desirable in sawing marble and other comparatively soft stone to use a thin saw-blade; and to this end our invention contemplates the provision of a stone-saw which may be made thin and at the same time embody means whereby it is adapted when in a kerf to permit the abrasive material employed to freely pass down to and under the teeth of the blade with a view of serving its purpose to the best advantage.

With the foregoing in mind the invention will be fully understood from the following description and claim when the same are considered in connection with the accompanying drawings, forming part of this specification, in which—

Figure 1:
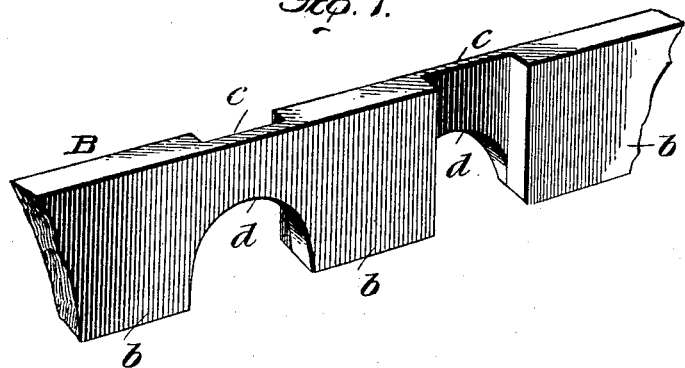
Figure 2:
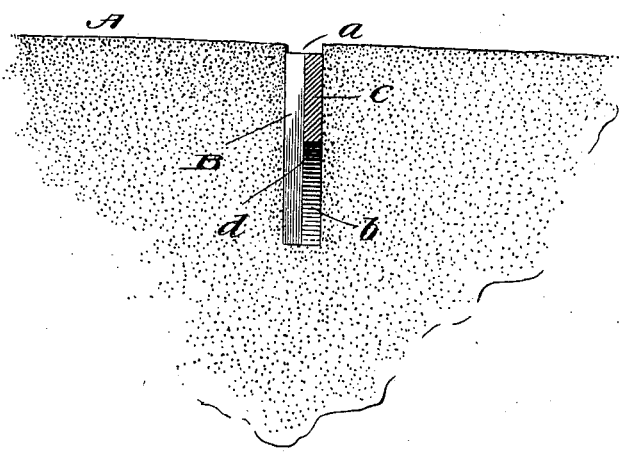

Figure 1 is a perspective view of so much of a saw-blade as is necessary to illustrate the preferred embodiment of our invention. Fig. 2 is a vertical section of a piece of stone and illustrating the saw in proper working position in a kerf formed in the stone.

Similar letters designate corresponding parts in both views of the drawings, referring to which—

A is a piece of marble or other stone which is shown as having a kerf $a$ therein, and B is our novel stone-saw as a whole.

The saw B is formed in one piece of steel or other material compatible with the function the saw is designed to perform, and it is made up of teeth $b$, extending throughout the thickness of the saw and also throughout the height thereof, as best shown in Fig. 1, and intermediate portions $c$ of a, thickness corresponding to about one-half that of the saw, arranged alternately in opposite sides of the saw. As will be readily apparent by reference to Fig. 1, the said intermediate portions $c$ have their upper edges flush with the upper edges of the teeth and complete saw and also have concave lower edges $d$, this in order to join the teeth together in a strong and durable manner and at the same time provide for the lower edges of the teeth alone bearing on the bottom of the kerf in a stone that is being sawed.

The intermediate portions $c$, of a less thickness than the teeth $b$, afford interdental spaces in opposite sides of the saw, which spaces are designed to serve when the saw is operating in a kerf of a stone to permit the abrasive substance employed to freely gravitate to the bottom of the kerf and pass under the lower edges of the teeth $b$, where it obviously will be most effective in accelerating the sawing of the stone, and by virtue of the said comparatively thin intermediate portions $c$ being alternately arranged at opposite sides of the saw it will be apparent that it is feasible to make the saw comparatively thin and calculated to operate to the best advantage in marble and similar comparatively soft stone without unduly weakening the saw. It will also be apparent that by reason of the teeth $b$ extending throughout the thickness of the saw and being of an even thickness throughout their height there is no liability of wedging the "shot" between the side walls of the kerf and the saw, and hence the production of a cut having a smooth and finished appearance is assured.

It will be gathered from the foregoing that notwithstanding the practical advantages ascribed to our improved stone-saw the same is susceptible of being manufactured quite as expeditiously and easily as the ordinary stone-saws extant.

Having described our invention, what we claim, and desire to secure by Letters Patent, is—

A stone-saw having teeth of a common thickness throughout their height, arranged at a suitable distance apart, and intermediate portions of a less thickness than and corresponding in height to the teeth, arranged alternately at opposite sides of the saw and lying entirely in the vertical plane of the teeth and having concave lower edges; the said comparatively thin intermediate portions affording interdental spaces extending throughout the height of the saw and adapted to permit the free passage of abrasive material to the bottom of a kerf in which the saw is disposed.

In testimony whereof we have hereunto set our hands in presence of two subscribing witnesses.

CORTIS KIMBALL GEORGE.
JOHN BURNETT.

Witnesses:
  EDWARD L. KITTREDGE,
  ALVA A. SIMONDS.